United States Patent [19]
Kruger

[11] 4,034,374
[45] July 5, 1977

[54] SEQUENTIAL LOBING TRACK-WHILE-SCAN RADAR

[75] Inventor: Bradford E. Kruger, Woodland Hills, Calif.

[73] Assignee: International Telephone and Telegraph Corporation, New York, N.Y.

[22] Filed: Nov. 10, 1975

[21] Appl. No.: 630,151

[52] U.S. Cl. .................. 343/16 R; 343/100 SA; 343/16 LS

[51] Int. Cl.² .................................... G01S 9/02

[58] Field of Search ........ 343/16 R, 16 LS, 100 SA

[56] References Cited
UNITED STATES PATENTS

| | | | |
|---|---|---|---|
| 3,266,038 | 8/1966 | Milne et al. | 343/16 R X |
| 3,487,408 | 12/1969 | Clarke | 343/16 R X |

Primary Examiner—T.H. Tubbesing
Attorney, Agent, or Firm—William T. O'Neil

[57] ABSTRACT

A sequential-lobing, radar, tracking device, particularly adapted to radars which scan mechanically in the azimuth plane and which have frequency-phase scan in addition. The phase scan operates to displace the beam in the vertical or elevation plane substantially normal to the plane of mechanical scan. Frequency scan provides a form of scan vernier and provides at least a substantial scan component in the direction of mechanical scan. The frequency scan is programmed to employ the time delay introduced between two vernier azimuth beam pair positions by the mechanical scan in azimuth, so that azimuth measurements, i.e., as between beams which tend to bracket a target, are made at the same transmitted frequencies. The azimuth measurement is therefore independent of frequency scintillation effects resulting from the unpredictable variation of radar target cross-section as a function of frequency.

10 Claims, 5 Drawing Figures

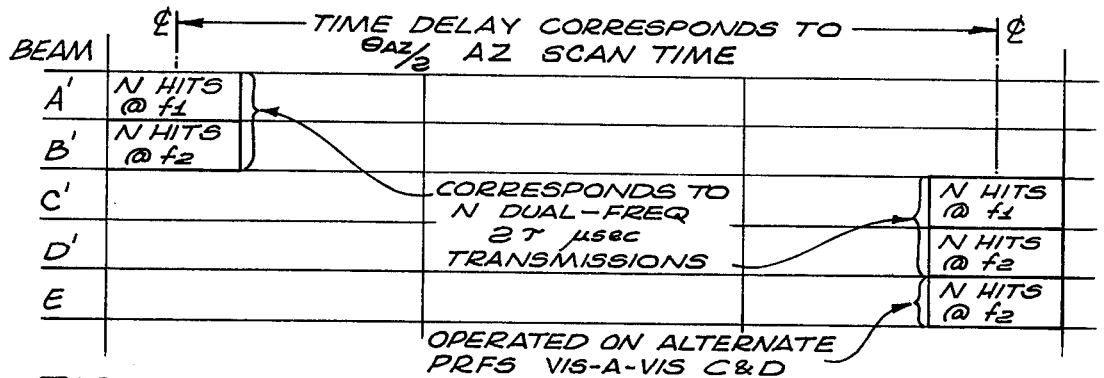
FIG. 3 TRACKING TIMING DIAGRAM
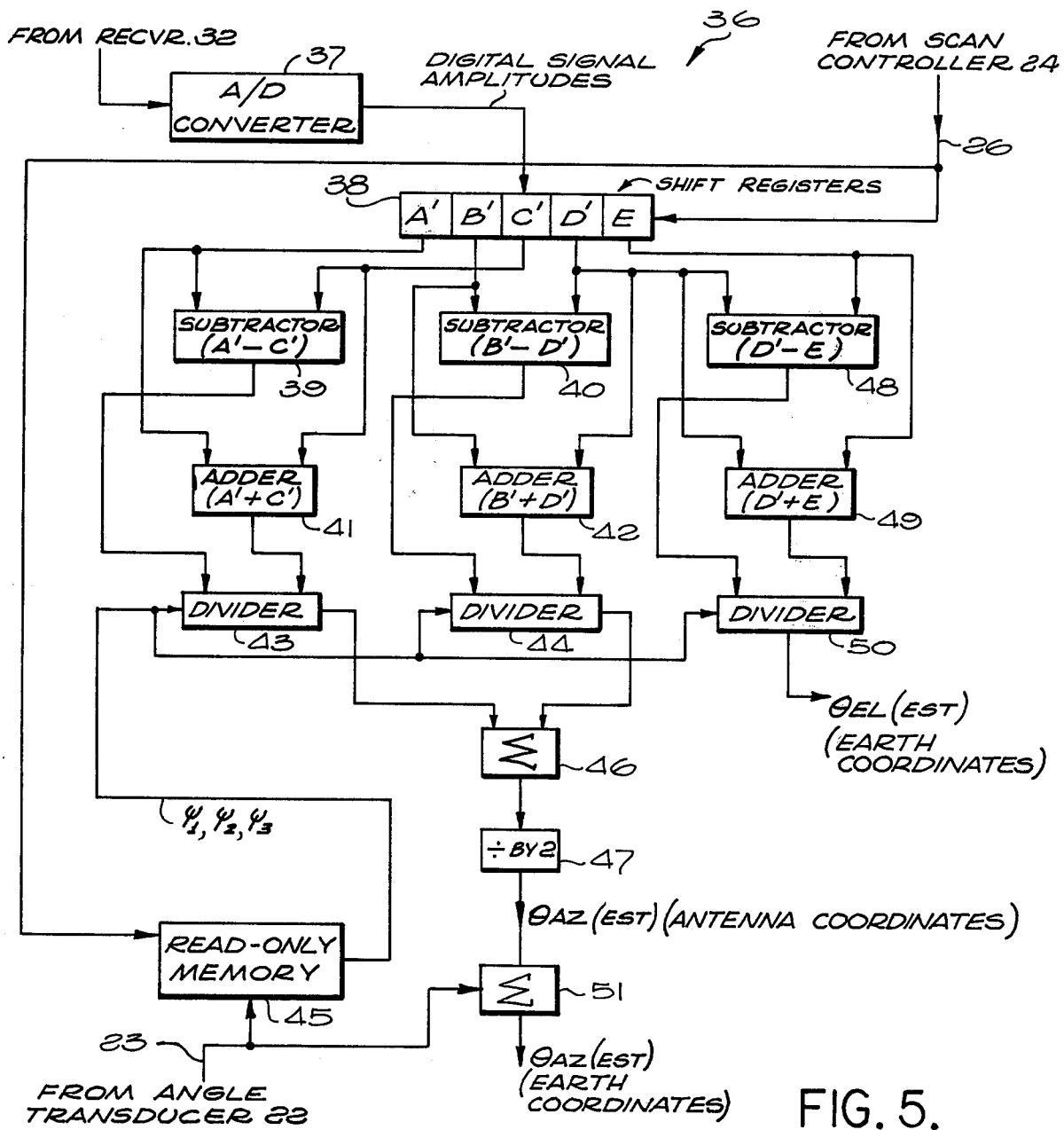
FIG. 5.

SEQUENTIAL LOBING TRACK-WHILE-SCAN RADAR

BACKGROUND OF THE INVENTION

1. Field of the Invention

The invention relates to radar systems in general and particularly to radar systems adapted for target tracking in a track-while-scan mode.

2. Description of the Prior Art

In the prior art, radar tracking systems and track-while-scan systems have been extant for several decades.

the textbook "Radar Handbook" by Merrill I. Skolnik (McGraw Hill 1970), provides a relatively current overview of the state to this art. Chapter 21 of that text is devoted entirely to tracking radar and provides a background in scanning and lobing, monopulse tracking techniques, conical scan, and sequential lobing. The present invention may be said to fall in the general area of sequential-lobing, angle-tracking devices. The phase/ frequency scanning arrangement applied to a basically mechanically scanned (in one coordinate) array antenna, is, per se, well known in the radar art. Chapter 13 of the aforementioned Radar Handbook discusses frequency scanning concepts, as well as phase scanning and various hybrids of these concepts. Use of a planar array, itself mechanically rotated, such that angle scanning can be effected electronically (inertialess scanning) in addition to the mechanical scan provided, is a combination also known per se, although not in the novel configuration of the invention.

FIG. 17 of the aforementioned handbook, Chapter 13, is particularly pertinent prior art in that it illustrates phase-frequency-scanning. Those skilled in this art are, therefore, well acquainted with these basic prior art techniques and structures.

Still further, the same text extensively treats the subject of phase shifters and their application to the phase control of radio frequency excitation in an array, such as is used in connection with the present invention. In typical mechanical rotating radars, (such as the classical PPI radar), the important parameters influencing the accuracy of azimuth angle measurement include the antenna azimuth beamwidth, the number of hits obtainable on a target, and the overall signal-to-noise ratio obtainable. The modern electronically scanned-radar system is also limited by such constraints, however, some important options are available for improving accuracy when the capability for inertialess electronically controlled beam steering or pointing is exploited.

In the same plane as the plane of the mechanical PPI scan (by array mechanical rotation) the beam may be electronically scanned over limited angles in a sense contrary to the mechanical rotation. This has the effect of placing more energy on the target with a potentially realizable improvement in accuracy.

Technically, this electronic scan performance may be provided in a phase-phase planar array configuration, i.e., one which scans in both elevation and azimuth angular coordinates using individual phasors on each radiating element of the antenna. While this may be an esthetically satisfying technical approach, it is a very expensive one. Since the planar array usually contains a relatively large number of elements in each array dimension, a correspondingly large number of phasors are therefore required.

A considerably less expensive approach involves replacement of one of the electronic phase scan coordinates with frequency scan, i.e., employing the well known principle of varying frequency driving a frequency-sensitive array to effect beam pointing (steering) in a corresponding coordinate. In this way, two-directional electronic angle scan (usually azimuth and elevation) can also be provided in an inertialess manner without the exceedingly high cost of a full phasor scan system.

For PPI type system involving mechanical rotation of an array in azimuth, the natural combination of low-cost electronic scanning functions involves phase for elevation and frequency for azimuth, the latter as a type of vernier scan associated with the tracking function within the PPI scanning coordinate.

To explore further the background of such devices, note that, in order for the antenna beam to be caused to remain on a given target for a period of time longer than available as a result of the mechanical antenna rotation, the frequency of transmission may be varied in accordance with the desired beam geometry about a given target.

An important limitation arises in the application of the aforementioned arrangement however, in that the azimuth measuring method is subject to frequency scintillation, that is, if the radar cross-section of a target differs from $f_1$ to $f_2$ or from $f_2$ to $f_3$, the resultant measurement obtained by processing signal amplitude returns on successive hits will be biased unpredictably. Such a technique is therefore accurate only if the radar cross-section is substantially identical for all frequencies within the operating band of the radar.

Quite obviously, the foregoing idealized target reflection properties are never realized in a practical situation. In fact, the radar cross-section of a given target may vary quite substantially from pulse-to-pulse and over a group of pulses. The resulting frequency scintillation problem defeats the potential of the arrangement to a greater or lesser degree, depending upon many other theoretical and practical considerations.

The manner in which the present invention overcomes the aforementioned prior art difficulties through employment of a novel beam pointing programming concept and instrumentation will be understood as this description proceeds.

SUMMARY OF THE INVENTION

In order to eliminate angle measurement errors due to frequency scintillation (in the azimuth plane for example), the present invention provides unique programming of the tracking beam geometry involving utilization of the time delay inherently afforded by the mechanical array rotation (mechanical scan). The programmed beam geometry about a given target involves transmission of a left-hand beam pair and a right-hand beam pair at the same phasor settings for (elevation plane scanning), the right-hand pair being transmitted at a later time corresponding to a half beamwidth (for example) of array rotation. Thus, azimuth measurements are made at the same frequencies, the frequency scan providing essentially only the angular spacing between the beams of a pair but not the angular spacing of the pairs themselves. The ($\theta AZ/2$) time delay thus performs a part of the beam pair pointing function in place of relying entirely on frequency programming therefor. Moreover, since the radar target cross-sections do not vary, due to frequency scintillation in this arrangement, that particular problem associated with the prior art approach, is eliminated.

The detailed manner in which the system according to the principles of the present invention is implemented will hereinafter be described.

BRIEF DESCRIPTION OF THE DRAWINGS

FIG. 3 is a tracking timing diagram illustrating the programming of the beam geometry of FIG. 2.

FIG. 5 is a block diagram showing the circuit elements contained in the signal processing block 36 of FIG. 1.

DESCRIPTION OF THE PREFERRED EMBODIMENT

For a mechanically rotating antenna, such as a PPI or sector scanning arrangement, the natural combination of low cost electronically superimposed scanning functions is phase for elevation and frequency for azimuth. Thus, in order for the antenna beam to remain on a target, the frequency of transmission is varied in accordance with the desired beam geometry about the target.

Figure 1:
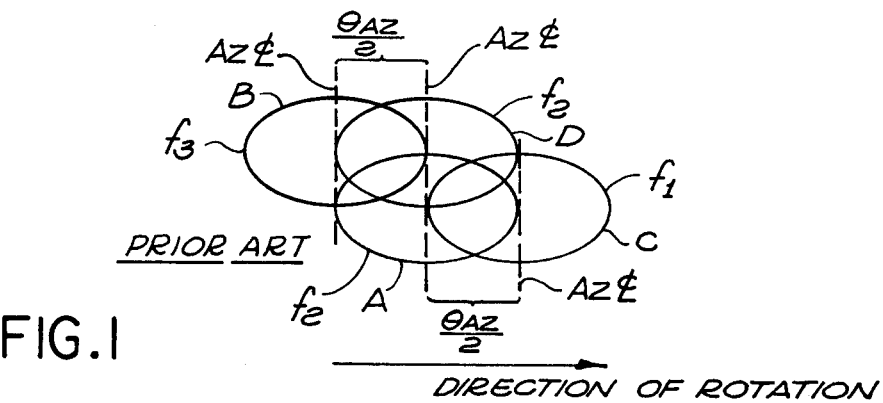
FIG. 1 is a beam geometry diagram (as seen from the radar site) depicting the prior art approach to frequency/phase beam programming for tracking in a system involving mechanical array rotation, such as in a PPI or mechanical sector scan.

In order to obtain accurate angular target measurement using a mechanically-rotating antenna and the frequency/phase overlying scan techniques aforementioned, (i.e., for example, using a rotating planar array) the sequential lobing method of beam programming as depicted in FIG. 1, naturally suggests itself. Although such a scanning/tracking scheme avoids the use of the more expensive monopulse or phase/phase approaches, it does suffer from the hereinabove described frequency scintillation problem.

On FIG. 1 the left-hand beam pair A and B, respectively, are transmitted at frequencies $f_2$ and $f_3$, followed immediately thereafter by the right-hand pair C and D at frequencies $f_1$ and $f_2$, respectively. The frequency increment between the successive beam pairs is such as to produce an advance of ($\theta AZ/2$), where $\theta_{AZ}$ is the effective beamwidth in azimuth in each of the individual beams in the configuration. The azimuth spacing between each beam within each beam pair is also to be noted to be one-half beamwidth. Still further, it will be noted that, in view of the frequency scan cross-talk, that is, the fact that frequency scan also produces a nearly equal component of incidental scan in the elevation plane, the axis of frequency scan beam progression is tilted by an angle approaching 45°. An arrow on FIG. 1 depicts the direction of mechanical rotation for the particular example being described.

In the arrangement of FIG. 1 the design of the antenna (the planar array for example) is such that, with appropriate phasor shift (programming) between the transmission of the A and B beam pair and the C and D pair, beam geometry may be constrained to conform to FIG. 1. Thus the two $f_2$ transmissions, i.e., beams A and D, depicted on FIG. 1, are directly above one another and line up in azimuth about an indicated azimuth angular centerline. Such a sequential-lobing geometry permits elevation and azimuth anuglar target location estimation. In elevation, the upper and lower $f_2$ beams (A and D) are used to obtain the frequency-scintillation-free elevation angular measurement with respect to the centerline (i.e., the average elevation position) between these two beams. In azimuth, both pairs of beams may be used to obtain an azimuth angular position estimate by amplitude comparison techniques.

It is to be understood, that the system is assumed to be a pulsed radar system and the aforementioned amplitude comparison is of received energy pulses along each beam.

As hereinbefore indicated, the arrangement of FIG. 1 may be considered a prior art arrangement and is, as indicated, subject to the frequency scintillation problem, basically because the frequency of each beam is not constant between successive pairs in azimuth.

Figure 2:
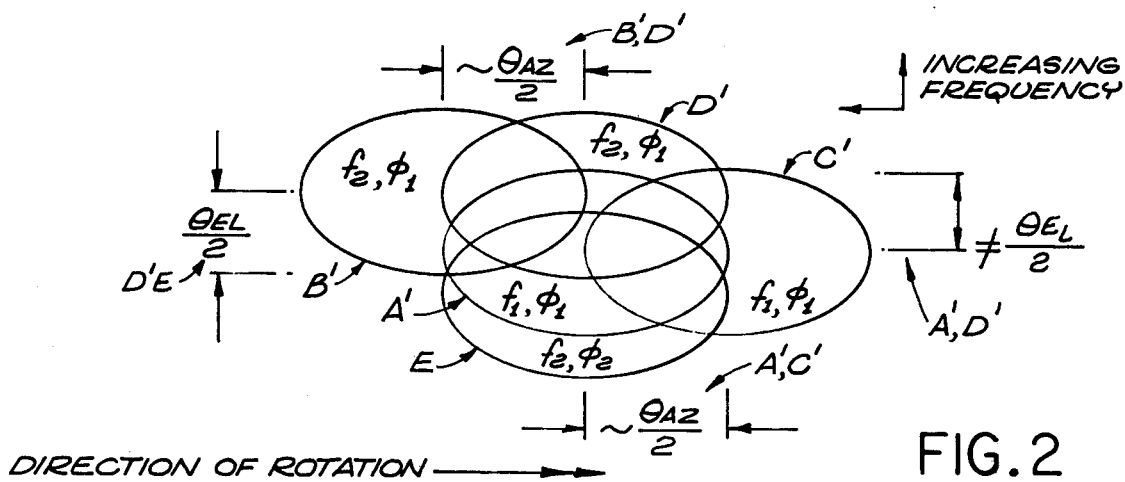
FIG. 2 is a beam geometry diagram in accordance with the present invention, also as seen from the radar site.

Referring now to FIG. 2, the operation of the unique arrangement of the present invention will be described, first from a strictly functional point of view.

In FIG. 2, beams A' and B' are transmitted first at two different frequencies $f_2$ and $f_2$. The transmission of these two beams of a beam pair are rapidly sequential, each representing a $\tau$ microsecond transmission within a 2 $\tau$ microsecond transmitter-modulator pulse. Accordingly, they must necessarily be transmitted at the same phasor setting $\phi_1$, since the agility of beam pointing as a function of phasor setting is not ordinarily as great as provided by frequency controlled beam positioning.

The frequency difference $f_1 - f_2$ is selected to result in approximately a ($\theta AZ/2$), i.e., one-half beamwidth azimuth difference. Depending on the frequency and elevation scan angle at any given time, there will be a variable elevation difference between beams A' and B'.

It is also useful to refer to FIG. 3, the timing diagram covering approximately a half beamwidth of the mechanical azimuth scan time. In the context of the mechanical rotation time-frame, the transmissions of beams A' and B' at $f_1$ and $f_2$ are nearly simultaneous, the N hits at each frequency are transmitted corresponding to N dual-frequency, 2 $\tau$ microseconds, transmissions. The boxes on FIG. 3 representing the N-hit timing at frequencies $f_1$ and $f_2$ is a relatively small, but not insignificant fraction of the time required for the azimuth mechanical array rotation mechanism to sweep the aforementioned half beamwidth in azimuth. Accordingly, the factor N may be relatively large. The actual value of this factor N will depend upon system requirements, the rate of mechanical azimuth rotation, and the PRF itself, as will be apparent from an understanding of the system of the invention.

After the elapse of a time sufficient to permit mechanical rotation of the antenna by one-half azimuth, beamwidth, beams C' and D' are transmitted, also at $f_1$ and $f_2$. These are also sequential within the 2 $\tau$ microsecond transmitter-modulator pulse. It will be seen from FIG. 3 that there is a corresponding non-transmitting gap in the azimuth mechanical program.

It has been noted that, during a single pass of the mechanical azimuth scanning, the beam pairs A' and B' and also the pairs C' and D'to are transmitted at the same $f_1$ and $f_2$, respectively, and it is also to be noted that all are transmitted at the same phasor setting $\phi_1$. From this, it will be seen that azimuth angle measurements are made at the same beam pair frequencies.

Figure 4:
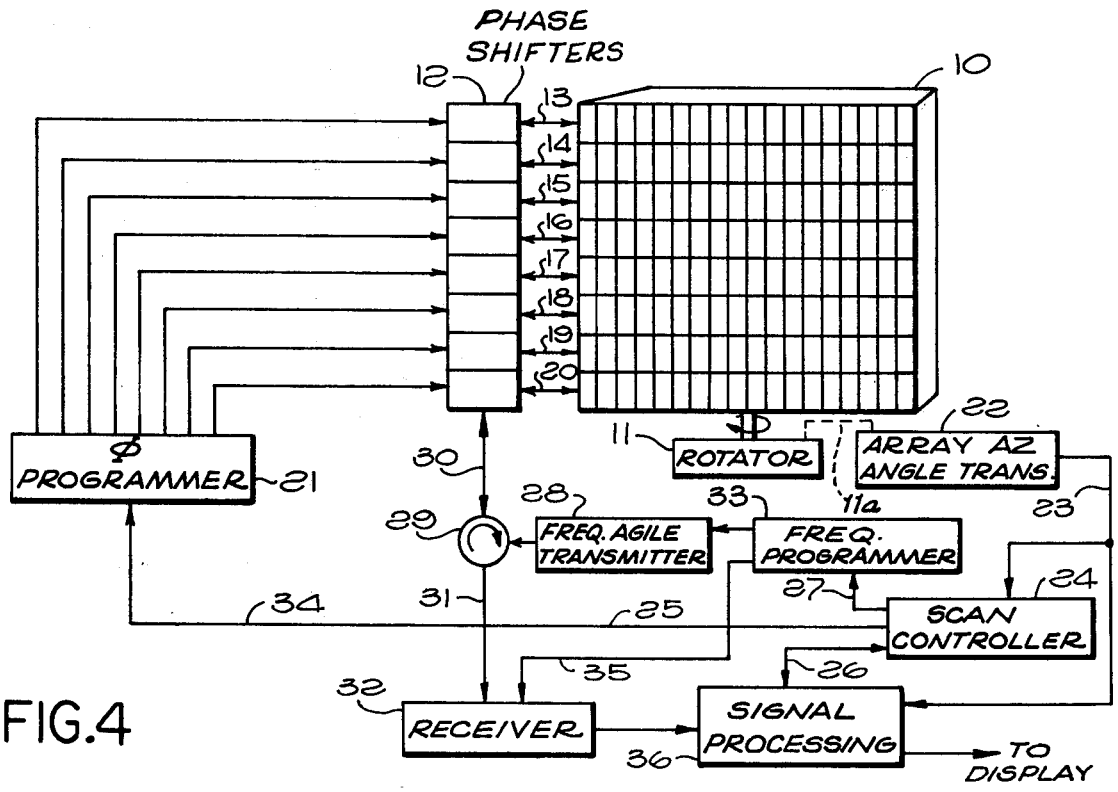
FIG. 4 is a schematic block diagram of a system in accordance with the present invention.

Referring now to FIG. 4, a novel arrangement of components each known, per se, in the prior art, is illustrated for producing the novel results thus far described. A planar array 10 of a known type, is provided as shown, and is of the type specifically adapted for frequency controlled beam-pointing in the azimuth plane (the same plane as scanned by the mechanical rotator 11), and for phase control of the pointing angle in elevation. These are various forms of planar array which may be used, one type involves vertically stacked horizontally extending slotted waveguides. Other configurations involve waveguide feed serpentine to provide the desired electrical spacing required to obtain the angle vs. frequency sensitivity desired. The prior art also shows use of individual dipoles fed by such a waveguide arrangement, the planar array then comprising a two dimensional matrix of individual radiators. U.S. Pat. No. 3.083,360 is representative and typical of the prior art for frequency/phase scan planar arrays.

As illustrated in FIG. 4, a bank of electrically controlled phase shifters (phasors) 12, provides the individual phase controlled feeds with discrete phases provided at leads 13, 14, 15, 16, 17, 18, 19 and 20, for the control of elevation beam angle.

Before exploring the scan mechanism further, refer to the azimuth array angle transducer 22 which provides an output signal on lead 23 continuously describing the instantaneous azimuth angle position of the array 10. This information is required in order to defined an angle of mechanical array rotation equal to one-half of the azimuth beamwidth, a parameter required to effect the novel beam positioning program herein described. The connection from the rotator 11 via lead 11a is to be understood to be a mechanical connection, and the transducer itself may be any known shaft angle encoder device, either analog or digital.

It will be realized at this point that the invention is capable of either analog or digital instrumentation, and the choice made in that regard, of course, dictates the nature of the output on 23, i.e., whether it is an analog or digital signal. It will be understood however, that the signal on lead 23 continuously described the rotational position of the array 10 with whatever degree of accuracy and granuality are consistent with the other parameters of the system.

The frequency programmed signal provided by the frequency agile transmiter 28 is generated in a manner well understood in this art. Either 28 or element 33 may be thought of as containing a controllable frequency synthesizer with appropriate microwave power amplification to generate the frequency modulated transmittable signal through the duplexer (circulator) 29 and, via lead 30 to the phasor bank 12 and thence to the array 10 where the frequency program effects the previously mentioned vernier positioning of the transmitted beam or beams in azimuth. Since the system is pulsed, echo signals are received by the array 10 and, by reciprocity of the array and phasors, are passed to the receiver 32 via signal path 30, the duplexer 29 and lead 31. The actual control of the frequency transmitted or generated for transmission by 28 is effected through a frequency programmer 33 and scan controller 24, which operate together in the manner well understood in this art. Thus, the two beams of a beam pair, as hereinbefore described, are generated by pulses of corresponding RF frequency, each for a duration of $\tau$ within a $2\tau$ transmitted pulse. Scan controller 24 provides control signals on 27 which are related to the elevation scanning phase program generated by programmer 21 by appropriately synchronizing the signals on leads 27 and 34. In this way an inertialess scanning operational format of the frequency phase two dimensional scanning type is provided. An appropriately offset frequency signal on lead 35 provides a local oscillator function in receiver 32 in accordance with quite well known techniques relating to frequency scan radar in general. The output of receiver 32 is supplied to the signal processor 36 and a display. The display may be a standard plan position indicator (PPI) or a sector scan indicator if the mechanical antenna programming is of the sector scanning type rather than the continuous 360° rotation. The display would be responsive to the output of 22 and the signal processed within 36, however, the display is, per se, not a part of the present novel combination.

Within the block 36, signal processing functions basically implement the following equation:

$$\theta_{AZ(EST)} = \frac{(\psi_1)\frac{B'-D'}{B'+D'} + (\psi_2)\frac{A'-C'}{A'+C'}}{2} \quad \text{(Equation I)}$$

The values $A'$, $B'$, $C'$ and $D'$ are the receive signal amplitudes of each of the four beams of FIG. 2 comprising two beam pairs as previously described. The terms $\psi_1$ and $\psi_2$ are coefficients for example, from a read-only memory within 36, from which an appropriate beam cross-over slope constant $\psi_i$ may be selected. This equation is simply the averaging of two independent measures of $\theta_{AZ}$(EST), the $B'$, $D'$ pair and the $A'$, $C'$ pair for the classical difference divided by sum angle measurement schemes.

Since the angular position of the array 10 is known at all times via the signals on 23 from block 22, the value $\theta_{EST}$ is readily calculated with respect to the instantaneous mechanical scan position. Further processing of this information to produce tracking or "homing in" of the beam centroid on a given target may be employed. Accordingly, the lead 26 may, in fact, be a two-way path whereby receiver signals used to calculate $\theta_{EST}$ can produce a signal modifying the values of $f_1$ and $f_2$ from one mechanical scan cycle to the next through the programmer 33.

It will be realized that the technique of the present invention is not dependent upon ($\theta_{AZ}2$) separation between beam pairs, the separation being only nominal and subject to modification within limits, according to timing requirements of other functions between the beam pairs of the track sequence. Differences from ($\theta_{AZ}/2$) merely require different $\psi$ values for the eangle estimation equation.

The sacn controller 24 may be though of as the source of pulse repetition pulses, such that it can generate $\tau$ microseconds pulses for beam E interleaved with the $2\tau$ microsecond $C'$ and $D'$ pulse transmissions. Beam E is transmitted at $f_2$ )to correspond to beam $D'$) and is offset ($\theta_{EL}/2$) from $D'$ by phase shifter setting $\phi_2$.

That is $(\phi_2 - \phi_1) \rightarrow \phi_{EL}/2$ \hfill (Equation II)

In accordance with the foregoing, elevation angle may be determined in a manner very similar to azimuth determination, but in accordance with the following equation:

$$\theta_{EL(EST)} = \psi_3 \frac{D' - E}{D' + E} \qquad \text{(Equation III)}$$

Referring now to FIG. 5, the details of the circuitry of the signal processing unit 36 of FIG. 1 will be explained.

On FIG. 5 the inputs from receiver 33, from the scan controller 24 via lead 26, and from the angle transducer via lead 23 will be noted. Received video signals generated within the various beams of the scanning system resulting from the pulse transmissions described, are passed from receiver 32 of FIG. 1 to analog-to-digital converter 37 on FIG. 5. It should be realized at the outset, that the processing within the device 36 may be either of an analog or digital nature, however, digital processing is particularly convenient and effective, and appropriate circuits are available as commercial subassemblies for digital signal processing in accordance with FIG. 5. The signal on lead 23 from the angle transducer 22 may likewise be digital and in fact is preferably so. The output of the analog to digital converter 37 contains all the digital signal amplitudes from all of the beams of FIG. 2. A signal from the scan controller 24 is applied to a block of shift registers 38 to enable an individual register to respond to a signal ampltidue at the time corresponing to the beam identifications A', B', etc. It will be noted that the signal on 26 is essentially an instantaneous, beam position, controlling signal which provides a digital number representative of instantaneous beam position from the azimuth angle transducer 22 as modified by the frequency program (and the phase program involve in elevation determination), these modifications being generated within the scan controller as a result of pre-programming therein and also in accordance with external beam angle commands as for example from a tracker feed-back connection. This scan controller 24 is a sequency programming device readily instrumented by a person skilled in this art from the well-described sequences of the overall operations.

From the stored values of beam amplitude A', B', C', D' and E in the register bank 38, subtractors and adders followed by dividers (modulated by $\psi_i$) provide for the implementation of Equation 1. The value $\psi_i$ at any given time is a function of beam shape and is readily encoded into the memory 45 as a function of angle. That is, the $\psi$ coefficients are amplitude-to-angle conversion factors which correct for instantaneous beam position with respect to the angle represented by the mechanical scan angle indentifying signal relating to each beam pair. Thus, it will be seen that substractors 39 and 40 produce the A' minus C' and B' minus D' terms, respectively. The subtractor 39 and adder 41 outputs are supplied to divider 43, and in the same manner substractor 40 and adder 42 outputs are supplied to divider 44. The outputs of these dividers are modulated by the beam cross-over coefficients supplied by the read-only memory 45 as a function angular electronic scan by the appropriate $\psi_i$ values (i.e. $\psi_1$, $\psi_2$ and $\psi_3$, as illustrated). The outputs of these dividers 43 and 44 are then added in a summer 46 and divider-by-2, 47. The result is the aforementioned $\theta_{AZ}$ (EST) value in digital form as an output. This output is in antenna coordinates, and is transformed to the necessary earth coordinates by summer 51, which adds the antenna coordinates to the antenna mechanical angle supplied on 23, thus producing earth coordinates.

The determination of elevation angle involves the additional beam E. This beam is generated at $f_2$, in the same time period as beam C' and D' are being generated but on a PRF which is staggered or alternated with the PRF pulses generating beams C' and D'. The beam E pulse is essentially a single frequency pulse and need only be in in duration as compared to the 2 $\tau$ two frequency pulses used for the generation of the A', B' beam pair and the C', D' beam pair. A reference to FIG. 3 helps to make this relationship entirely clear.

The estimation of $\theta_{EL}$ (EST) is accomplished by instrumenting Equation 3. In FIG. 5, these digital beam amplitude values D' and E are supplied to another subtractor 48 and to an adder 49 whose outputs are divided and modulated by $\psi_3$ from read-only memory 45 in the divider 50. The output of 50 is therefore a digital number giving the estimated $\theta_{EL}$ (EST) value.

In order to keep transmitter duty factor high, and to minimize total track time, the normal PRF of each of the C', D' and E beam positions is increased by three halves, and interleaved. Accordingly, the critical elevation angle measurement has neither amplitude nor frequency scintillation effects associated with it. Moreover, the elevation measurement is independent of azimuth offset, being associated only with the elevation portion of the track beam geometry, i.e., the relationship between beams D' and E.

The technique and arrangement of the present invention will be found to be applicable to any track-while-scan mechanically rotating radar employing pahse (elevation)/frequency (azimuth) scanning superimposed on the mechanical scan.

Modifications and variations in the embodiments described will suggest themselves to those skilled in this art, accordingly, it is not intended that the drawings or this description should be intended as limiting the scope of the invention, these being illustrative and typical only.

What is claimed is:

1. An angle tracking system for a track-while scan pulsed radar, comprising:
    a pencil-beam-forming array capable of providing inertia-less scan in at least a first scanning coordinate as a function of the frequency of RF energy applied thereto;
    first means for mechanically rotating said array to scan said beam in said first coordinate, including angle transducer means for continuously providing a mechanical scan angle identifying signal;
    second means including a pulsed, frequency-agile transmitter, a receiver and duplexing means for energizing said array with RF pulses and for receiving corresponding target echoes, the variations of frequency of said RF pulses providing a superimposed scan in said first scanning coordinate;
    third means responsive to a first control signal for generating a pulsed frequency program to control said second means to transmit a sequential lobing pattern of N pulses at a first radio frequency and N pulses at a second radio frequency on a time shared basis within each of N successive transmitter pulses, said first and second frequencies corresponding to first and second beam positions overlapping by a first predetermined angle in said first coordinate;
    fourth means responsive to said angle indentifying signal for generating said first control signal and for programming said first control signal to effect repetition of the lobe sequencing provided by said third means to provide third and fourth beam positions overlapping by a second predetermined angle in said first coordinate, said fourth means also being operative to program said first control signal to produce a quiescent transmitter period between the end of said N transmitted pulses from said second means corresponding to said first and second beam positions and the beginning of N transmissions corresponding to said third and fourth beam positions;

and fifth means responsive to the relative amplitudes of received signals at each of said beam positions and to said angle identifying signal for generating a value corresponding to the estimated angular position of a given target.

2. Apparataus according to claim 1 in which said array is further defined as comprising beam forming structure for providing beams of substantially equal width in each of said first, second, third and fourth beam positions, said first scanning coordinate being further defined as the azimuth coordinate.

3. Apparatus according to claim 2 in which said first, second, third and fourth beam positions are identified as beams A', B', C' and D', respectively, and said fifth means contains means for determining the estimated azimuth of a given target according to the equation:

$$\theta_{AZ(EST)} = \frac{(\psi_1)\frac{B'-D'}{B'+D'} + (\psi_2)\frac{A'-C'}{A'+C'}}{2},$$

Where $\psi_1$ and $\psi_2$ are beam cross-over constants.

4. Apparatus according to claim 3 in which a read-only memory is provided in said fifth means for providing beam cross-over coefficients ($\psi_i$) as a function of the displacement from the instantaneous position defind by said angle identifying signal of each beam pair (A', B') and (C', D').

5. Apparatus according to claim 1 in which said first scanning coordinate is further defined as the azimuth coordinate and said first means is further defined as means for rotating said array continuously in one direction through a full 360° each revolution.

6. Apparatus according to claim 5 in which said first, second, third and fourth beam positions are identified as beams A', B', C' and D', respectively, and said fifth means contains means to determine the estimated azimuth of a given target according to the equation:

$$\theta_{AZ(EST)} = \frac{(\psi_1)\frac{B'-D'}{B'+D'} + (\psi_2)\frac{A'-C'}{A'+C'}}{2},$$

where $\psi_1$ and $\psi_2$ are beam crossover constants.

7. Apparatus according to claim 6 in which a read-only memory is provided in said fifth means for providing beam amplitude coefficients ($\psi_i$) as a function of the displacement from the instantaneous position defined by said angle identifying signal of each beam pair (A', B') and (C', D').

8. Apparatus according to claim 7 further defined in that a phase programmer is provided to control the elements of said array to produce independent positioning of the transmitted beam, said phase programmer being responsive to said fourth means, said fourth means comprising means for programming said third means and said second means to transmit N ancillary pulses at a second frequency and at pulse intervals interleaved with said pulses generating said first, second, third and fourth beams, for defining an E beam, said fourth means containing means for programming said phase controller to place said E beam at an angle displaced in elevation with respect to the center of said first, second, third and fourth beams as a group; and in which said fifth means includes means for estimating the elevation angular position of a target echo by solving the equation $$\theta_{EL(EST)} = \psi_3 \frac{D'-E}{D'+E}.$$

9. Apparatus according to claim 1 in which said array is further defined as comprising beam forming structure for providing beams of substantially equal widthin each of said first, second, third and fourth beam positions, said first scanning coordinate being further defined as the azimuth coordinate, said predetermined angles being defined as each being equal to approximately $\theta/2$, where $\theta$ is the effective beamwidth of said first, second, third and fourth beams in said azimuth coordinate, said effective beamwidth being measured between 3db points.

10. Apparatus according to claim 9 in which said fourth means is further defined as including means for producing said quiescent transmitter period approximately equal to the time required for said first means to scan through an angle equal to said $\sim\theta/2$.

* * * * *